3,345,835
RETRO-REFLECTIVE STOP MOTION SYSTEM
Lawrence Creigh Nickell, Ronceverte, and Raymond Baines Fertig, Saint Albans, W. Va., assignors to Appalachian Electronic Instruments, Inc., Ronceverte, W. Va., a corporation of West Virginia
Filed Dec. 11, 1964, Ser. No. 417,697
12 Claims. (Cl. 66—166)

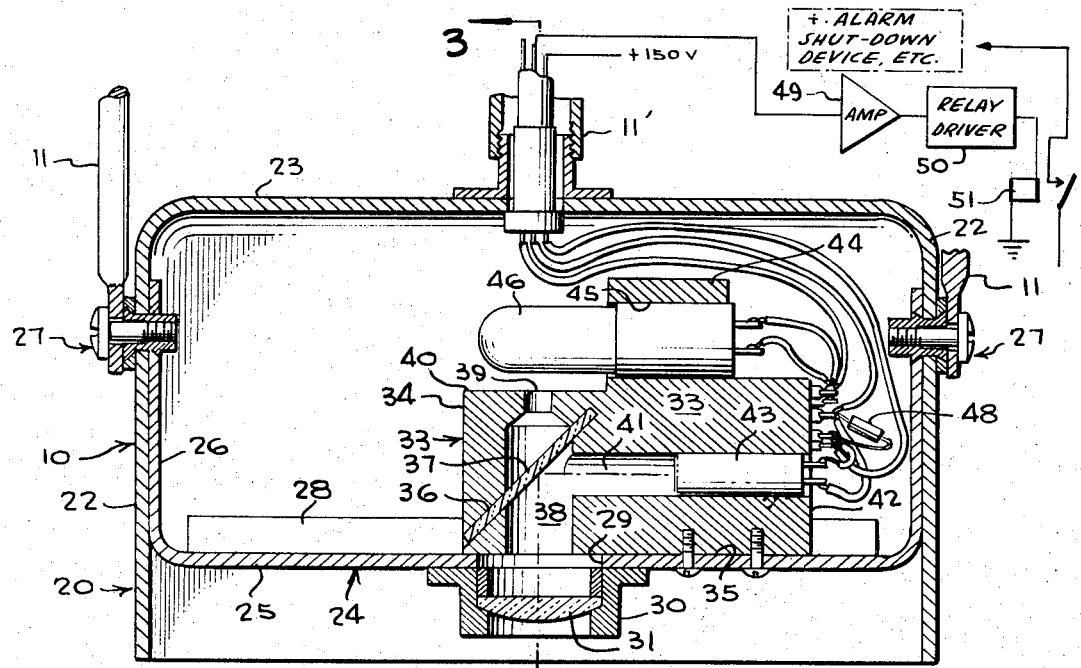
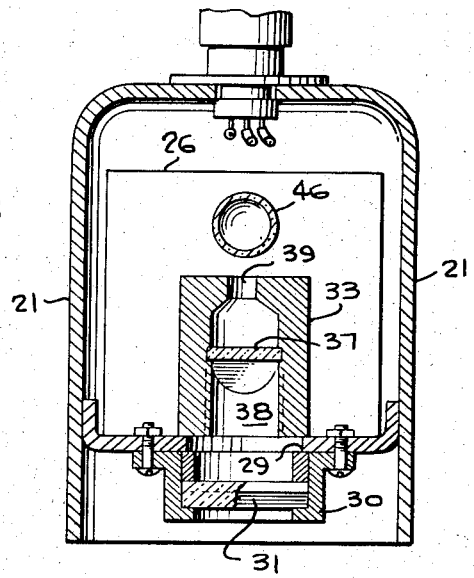
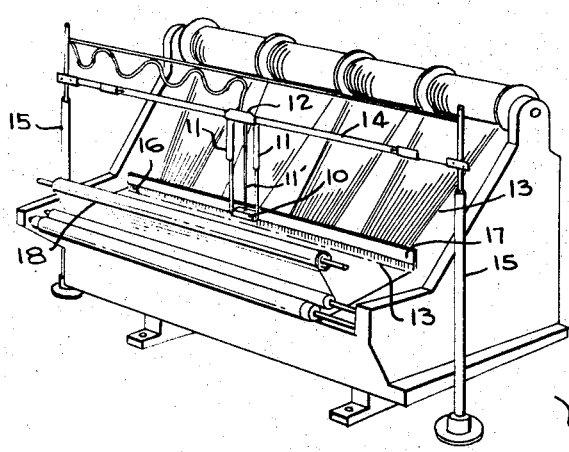
INVENTORS
LAWRENCE CREIGH NICKELL &
RAYMOND BAINES FERTIG
BY Mason, Fenwick & Lawrence
ATTORNEYS

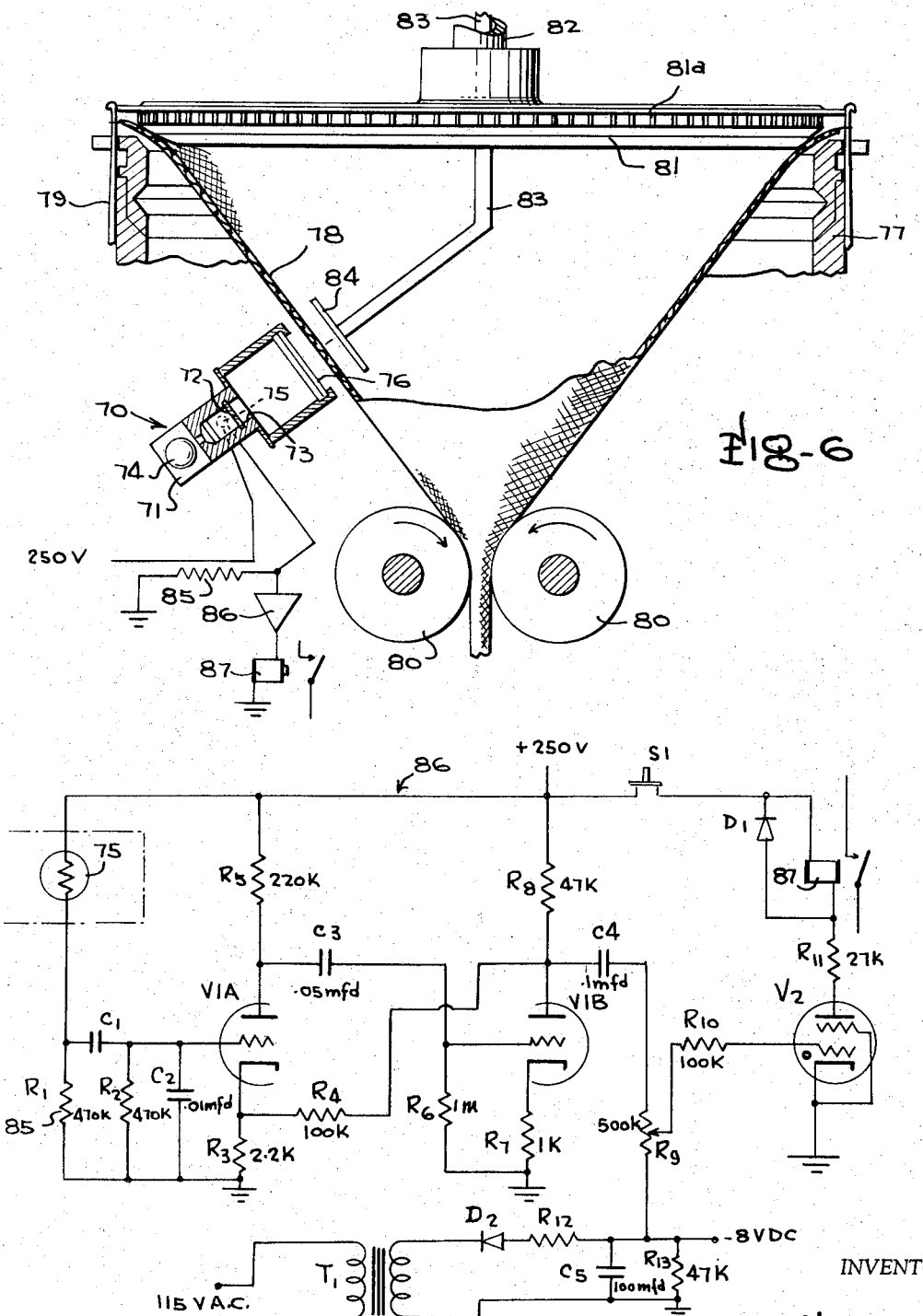

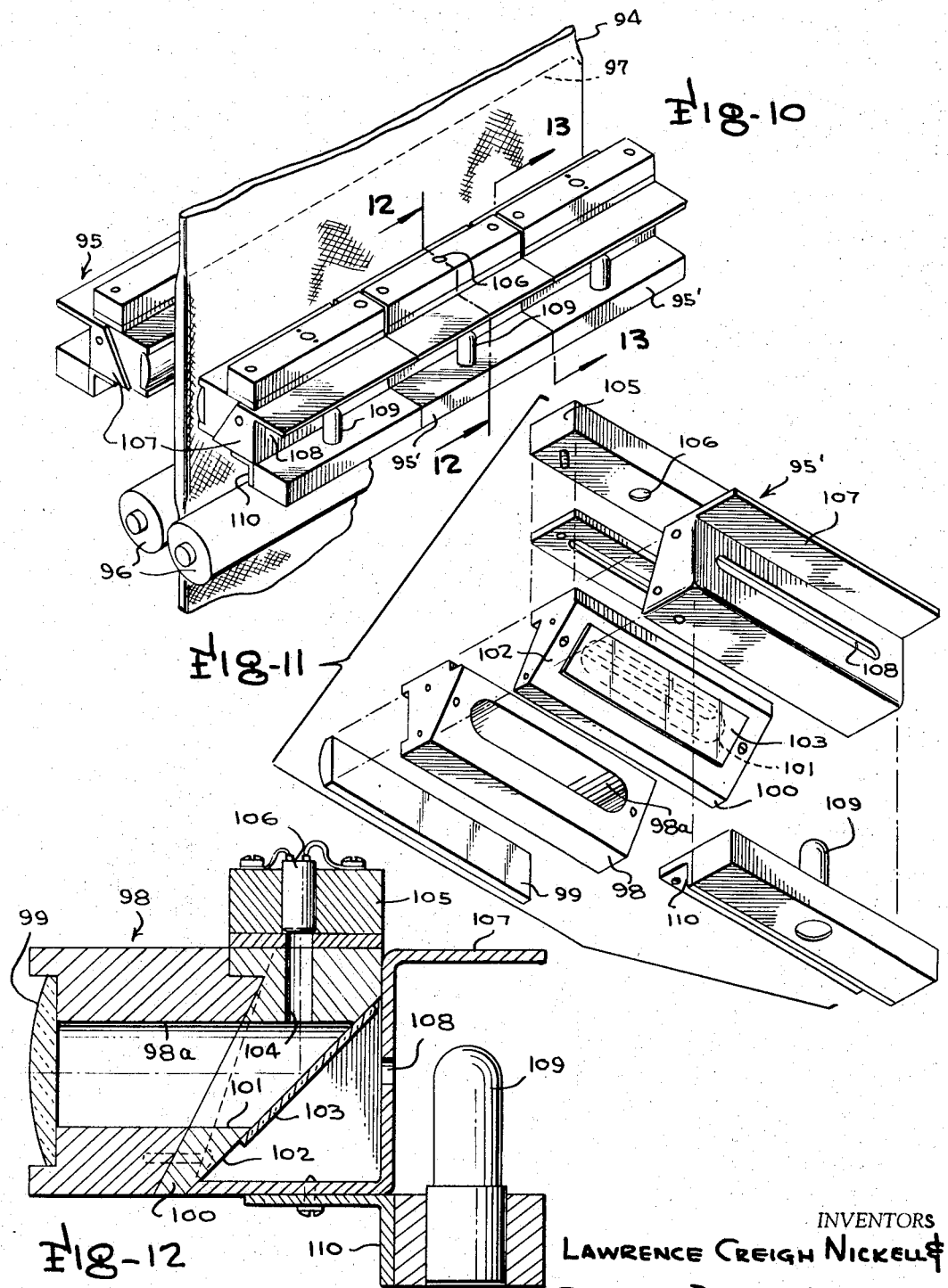

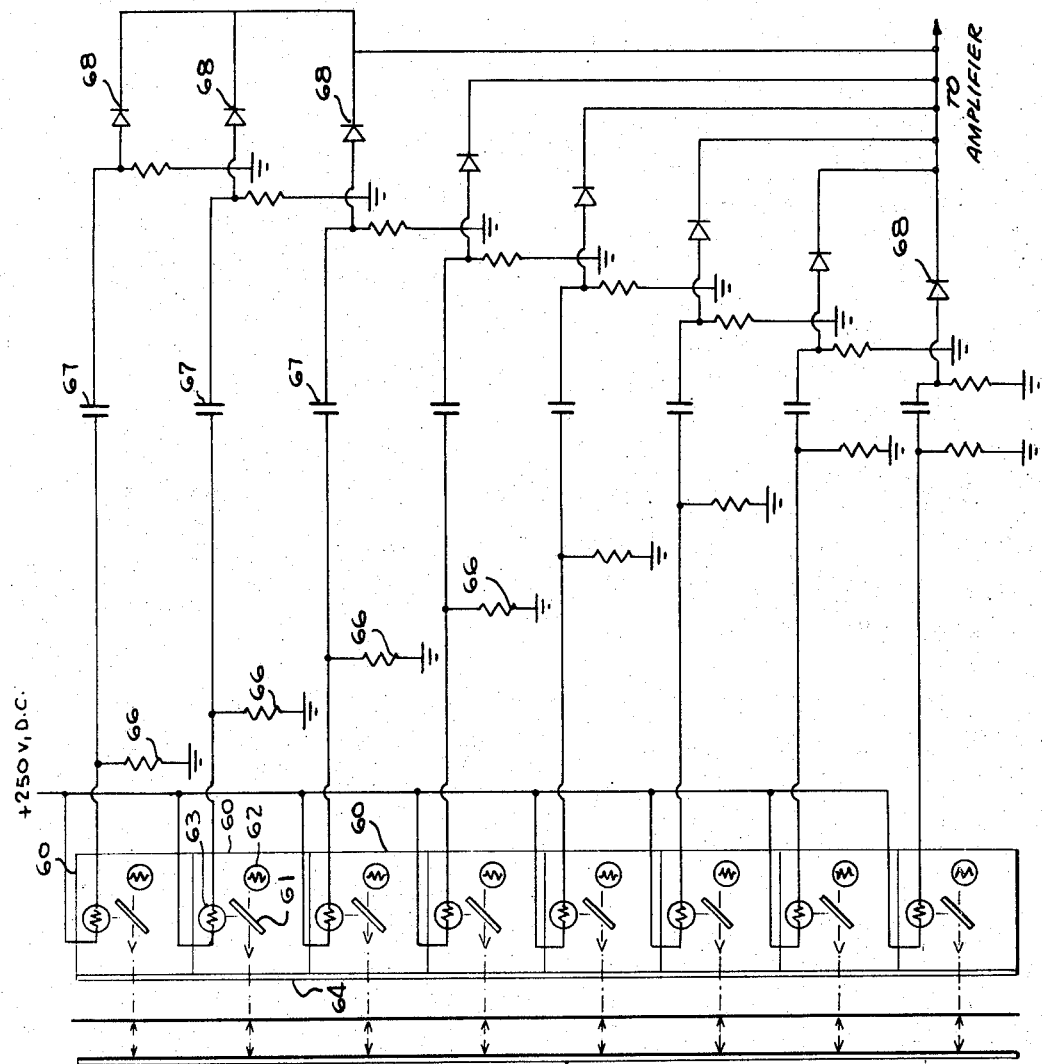
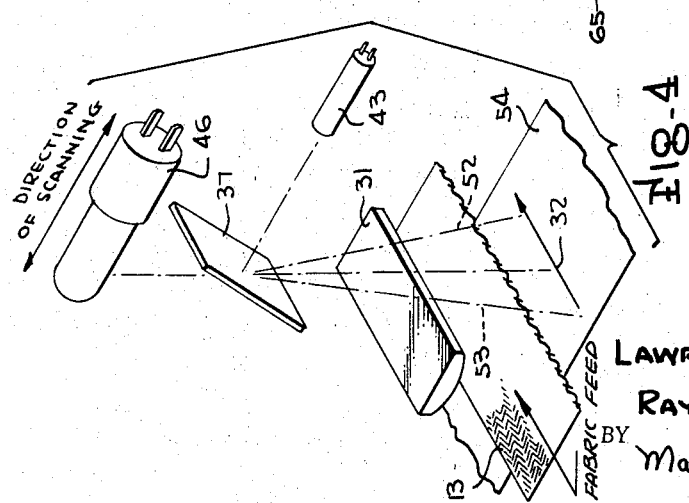

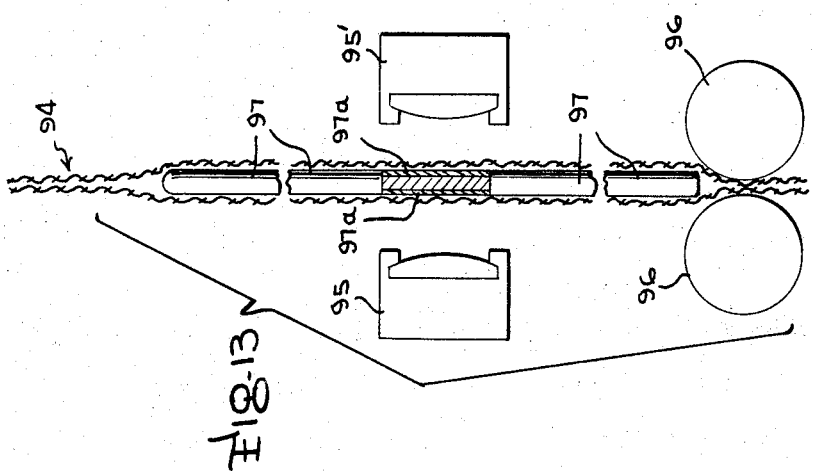
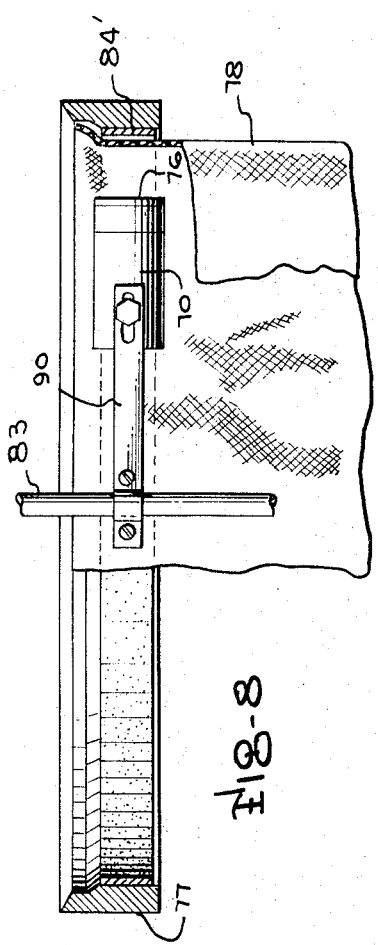
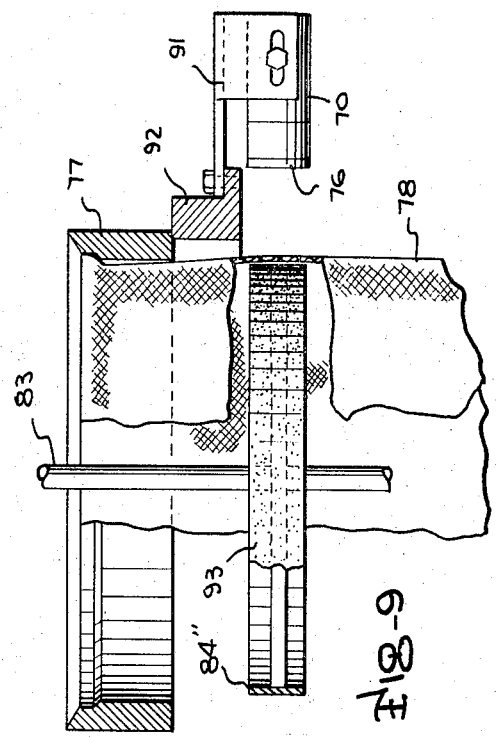
INVENTORS
LAWRENCE CREIGH NICKELL &
RAYMOND BAINES FERTIG
BY Mason, Fenwick & Lawrence
ATTORNEYS United States Patent Office 3,345,835
Patented Oct. 10, 1967

ABSTRACT OF THE DISCLOSURE

A fabric flaw detecting apparatus for detecting flaws such as holes, runs and other aperture defects or conditions in fabric, particularly knitted fabric, while the fabric is moving relative to a fabric handling machine and producing defect signals upon occurrence of such aperture conditions, including a detector head providing a substantially point source of light, optical lens means, particularly a cylindrical lens, for concurrently directing light rays from the source along diverse incident ray paths which diverge from the light source to form an elongated image of light, preferably a line image of light, at the fabric to be inspected. In some applications the line image of light may be elongated perpendicular to the relative direction of travel of the fabric, and in other applications may be elongated in a direction paralleling the direction of fabric travel. The detector head may be stationary, or may be scanned along rectilinear scan axes traversing the width of the fabric, in which event the elongation of the image of light is preferably perpendicular to the scan axis. Retro-reflective means are provided on the opposite side of the fabric from the detector head to receive light from the source intercepted by any of the aperture conditions in the fabric and retro-reflect the light back along its incident ray path to a semitransparent mirror which redirects the retro-reflected light onto a photocell to produce signals indicative of fabric flaw detection.

---

The present invention relates in general to fabric flaw detecting apparatus, and more particularly to apparatus for detecting flaws in textile fabric webs by use of retro-reflected light and involving an optical system by which light is directed through the fabric under inspection toward a retro-reflective surface along diverging incident ray paths lying in a single plane to form an elongated line image and retro-reflected light from any point in the line image is directed back along the incident ray path and onto a photocell. Such apparatus may be used either as a stationary fabric inspecting installation or as a reciprocating scanning head moving transversely back-and-forth across fabric exiting from a knitting machine.

Heretofore, devices commonly known as "stop motion" devices for automatically detecting defects, particularly runs or holes in textile fabrics have been in wide use. Such devices commonly employ a scanning head which is reciprocated back-and-forth on a horizontal supporting bar over the knitted fabric, usually in the zone between the needles and take-up roll of warp knitting machines, to scan the width of the fabric as it passes from the needle zone. The scanning head customarily includes one or more photoelectric cells, a light source, lens means forming an image of a limited fabric zone on the photocell, and external connections for coupling photocell output signals to an amplifier circuitry. Typical examples of such devices may be found in U.S. Patents Nos. 2,711,094 and 2,859,603 to Edelman et al. and No. 3,046,767 to Nickell, one of the co-inventors of the present invention. Such stop motion scanning heads relied upon the difference between the reflected light intensity received from too closely adjacent zones of the fabric to attain a sufficient great difference between normal fabric signals and defect signals to insure reliable defect detection and to avoid false stopping due to flutter or vibration of the fabric. It has been generally unsatisfactory to rely merely on single cell response to light increases through fabric defects, even where mirrors are provided beneath the fabric, as a means of defect detection. The use of multiple photocells and comparison circuitry has, of course, rendered the devices more complex and expensive, and has also introduced serious problems of properly matching electronic components.

Where a mirror was employed below the fabric, in conjunction with a movable scanner head, as in Patent No. 2,711,094, it was found that one cannot maintain sufficiently critical alinement to insure return of reflected light to the photocell. Further, the limited area of fabric surface to which the photocell was exposed through the lens provided only a very short and highly critical period when the fault, such as a run or hole, could affect the photocell conductivity, the light sensing region being in the nature of a narrow line traced transversely across the fabric as the head was scanned across the width of the fabric. Also, such devices have such restricted capacity to sense light variations as to render them unreliable for detecting flaws in multi-colored materials such as plaids.

The problems of the above-described nature encountered in flat fabric scanning have also limited practical use of such devices for scanning tubular or circular knit fabrics since the inability to develop sufficient sensitivity to reliably detect runs or holes by the additional light intensity admitted to the photocell by such runs or holes and the concurrent axial progression and rotation of the knit fabric tube as it leaves the needles rendered it difficult to devise flaw detectors suitable to the structural environment encountered in circular knitting devices or the conditions involved in sensing tubular fabric.

An object of the present invention is the provision of novel fabric flaw detecting apparatus which is highly reliable in operation and of more simple construction than devices heretofore designed for this purpose.

Another object of the present invention is the provision of novel fabric flaw detecting apparatus which significantly increases the intensity of defect signals relative to normal signals to facilitate more reliable flaw detection with simplified structure capable of being incorporated in a wide variety of knitting installations.

Another object of the present invention is the provision of novel fabric flaw detecting apparatus wherein light emanating from a substantially point source is spread along divergent paths along the direction of fabric movement to produce a line image of light at the fabric, and wherein light passing through defects in the fabric are reflected back to a photo-detector wherever the line image encounters a flaw to enhance flaw detection.

Other objects, advantages, and capabilities of the present invention will become apparent from the following detailed description, taken in conjunction with the accompanying drawings illustrating several embodiments of the invention.

In the drawings:

FIGURE 1 is a diagrammatic perspective view of a flaw detecting scanning apparatus embodying the present invention, shown in association with a warp knitting machine;

FIGURE 2 is a vertical longitudinal section view of the scanner head of a flaw detector embodying the present invention;

FIGURE 3 is a vertical transverse section view of the scanner head, taken along the line 3—3 of FIGURE 2;

FIGURE 4 is a diagrammatic perspective view of the basic optical components of the scanner head illustrating the principles of operation thereof;

FIGURE 5 is a diagrammatic view of a modification of the present invention involving a plurality of side-by-side detector heads to detect flaws in wide fabric;

FIGURE 6 is a diagrammatic view of another modification of the present invention employed to detect flaws in the tubular fabric knitted by a circular knitting machine;

FIGURE 7 is a schematic diagram of an exemplary control amplifier that may be used with the system of FIGURE 6;

FIGURES 8 and 9 are diagrammatic views illustrating other forms of installations of the flaw detector head in conjunction with circular knitting machines;

FIGURE 10 is a perspective view of further modification of a flaw detector embodying the present invention installed in a layout room for preparing circular knit fabric for cutting;

FIGURE 11 is an enlarged exploded perspective view of the flaw detector shown in FIGURE 10;

FIGURE 12 is a vertical section view thereof, taken along the line 12—12 of FIGURE 10, and FIGURE 13 is an enlarged vertical section view taken along the line 13—13 of FIGURE 10 with the detector heads shown in diagrammatic form.

The present invention achieves the production of a defect signal (i.e. the light return to the photocell signifying presence of a run, a hole or a similar defect in the fabric under inspection) which differs by such a significant ratio from the normal signal representing the light intensity received by the photocell from normal fabric areas as to permit reliable detection of flaws with a single photocell and in some instances without amplification circuitry for the photocell output, and which is capable of detecting flaws in tubular knit material either immediately following knitting of the tube at the needles or upon drawing of the material through an inspection station in substantially flat condition. This significant increase in the defect signal/normal signal ratio arises from the conjoint action of two features of the present invention; the use of a cylindrical lens through which light is spread along divergent paths in a plane perpendicular to the fabric surface to define a line light image on the fabric elongated in the direction of fabric movement, and the use of retro-reflection back-up material behind the fabric.

Retro-reflective material is a material which effects reflection or return of light to the source along the same path as the incident light rays regardless of the angle of incidence. That is to say, the rays reflected by the material return along a path which substantially parallels the incident ray path, unlike normal reflection in which the reflected ray is symmetrical to the incident ray in relation to the perpendicular at the point of incidence. This type of reflection is most commonly accomplished through the use of small, spherical lenses or lenticulae that are placed over a specular reflecting surface. If the retro-directive reflective system is properly constructed, light passing through the lenticulae focuses on the specular reflecting surface, is reflected back through the small lenses, and returns in essentially the same direction from which it came. The path of retro-reflective light is similar by degree to the path of incident light, so that materials that reflect light retro-directively return a maximum reflective signal toward the point of origin with a minimum of incident energy. Since ordinary surfaces either scatter light or reflect most of it at an angle equal to the angle of incidence, retro-reflective light can be one hundred times or more stronger than ordinary reflected light. The system is therefore auto-collimating, every ray being reflected in the direction of incidence regardless of the particular angular position of the reflecting element. Examples of such retro-reflective material are "Scotchlite" band reflective sheeting or tape manufactured by Minnesota Mining and Manufacturing Co.

A specific embodiment of the invention as a scanning head for scanning a knit fabric web on a warp knitting machine is illustrated in FIGURES 1–4. Referring to these figures, the scanning head 10 is supported in the usual fashion on a depending pair of arms 11 from a suitable carriage 12 which runs back-and-forth transversely across the width of the fabric 13 on a channel or supporting rail 14 mounted on vertical supporting posts 15. The scanning head is designed to continuously inspect the fabric passing through the scanning zone, indicated generally by broken line 16 as the fabric travels from the needles 17 to the take-up roll 18, to immediately sense runs, holes or similar flaws in the fabric and stop the knitting machine upon occurrence of such a flaw.

The scanning head 10 comprises an outer casing 20, which may be drawn aluminum, in the form of a downwardly opening box, having vertical sides 21 and ends 22 and a horizontal top wall 23. An assembly plate 24 is secured within the outer casing 20, and includes a horizontal panel 25 corresponding substantially to the internal horizontal cross-section of the outer casing to nest therein, along ascending end flanges 26 secured by suitable fasteners 27 to the outer casing 20 providing connections for the lower ends of the arms 11, and short side flanges 28. An opening 29 is provided at an intermediate location in the panel 25 to form an optical aperture, and a lens mounting tube 30 is fixed to the panel 25 in alinement with the opening 29 and extending below the panel to support the lens 31. The lens 31 in the preferred embodiment is a plano-convex cylindrical lens arranged with its axis of curvature disposed parallel to the direction of fabric feed from the needles 17 to the takeup roll 18 or perpendicular to the direction of scanning head travel along the rail 14, to spread light from a substantially point light source along diverging ray paths lying in a single plane perpendicular to the fabric plane and parallel to the axis of curvature of the lens to form an elongated line image, for example of about one inch in length, at the fabric plane, as indicated by the arrow 32 in FIGURE 4. It will be appreciated that other lens configurations than the plano-convex lens illustrated in the drawings may be used so long as they produce the desired fanning out of light rays to produce a line image from a point light source.

Mounted on the panel 25 and extending above the same within the outer casing 20 is a lamp and cell mounting block 33 providing in convenient form a single body to rigidly support in proper alinement all the optical components of the system other than the cylindrical lens 31. The mounting block 33 is cut from the front end wall 34 thereof along a 45° angle to the surface of the front wall 34 and bottom wall 35 to form a kerf 36 of appropriate width and depth to receive and fix in position a semi-transparent mirror 37. Before insertion of the mirror 37 or beam splitter, the block 33 is drilled from the bottom wall 35 to provide a bore 38 extending to a point near the top of the front wall 34, and a narrower bore 39 is drilled through the surface 40 to provide a masking aperture of small diameter forming a substantially point source. The bore 39 may be, for example, about .033 inch diameter. It will be appreciated of course that a thin masking disk may be inserted, if desired, in the bore 38 near the top thereof to provide the desired small opening. A photocell housing bore 41 is also drilled from the rear wall 42 of the block 33 to the bore 38 at right angles to the latter in alinement with the portion of the semi-transparent mirror 37 lying in the bore 38, to house a photocell 43, for example a cadmium sulfide photocell. A vertical extension portion 44, of the block 33 rising above the surface 40 is provided with a bore 45 paralleling the bore 41 to house a suitable lamp 46, the portion 44 terminating in rearwardly spaced relation to the front wall 34 to provide a recess or rabbet into which the bulb of the lamp projects to dispose the lamp filament in alinement with the axis of bore 39. Suitable terminals may be fixed on the rear wall 42 of the block 33 to anchor conductors from the lamp 46 and photocell 43 before they are lead out of the casing 20 through the cable 11' to the amplifying circuitry. As indicated in FIGURE 2, the photocell 43 may be connected through a resistor 48, for example of 470,000 ohms, to a 150 volt D.C. source and to an amplifier 49, whose output controls a relay driver 50, such as a thyratron, a flip-flop, a one-shot multivibrator, or similar known means, having a relay 51 in its output circuit to energize an alarm, shut-down device, or other output device. The responsive circuitry is such that, when light of appropriate intensity strikes the photocell 43, the resistance of the cell decreases, causing an increase in current through the resistor 48, resulting in a pulse which is coupled to the input of the amplifier 49 to actuate the control relay 51.

It will be understood that with such an optical system, the light rays emanating from the lamp 46 will be restricted to a suitable small diameter simulating a substantially point source by the bore 39, or the masking disk if used, and will pass through the semi-transparent mirror 37 and be directed by the cylindrical lens 31 in a plane paralleling the axis of curvature of lens 31 along divergent ray paths, the limits of which are indicated at 52 and 53 in FIGURE 4, toward the fabric 13 to form a line image 32 at the fabric zone which is elongated in the direction of travel of the fabric. As previously stated, this line image may be about one inch long. Immediately beneath the fabric 13 at the fabric scanning zone is located a strip of retro-reflective material, indicated at 54 in FIGURE 4, of the type previously described, which is fixed on a suitable flat surfaced backing or support and spans the width of the fabric 13 in alinement with the scanning head. The strip of retro-reflective material is of sufficient width (in the direction of fabric feed) to span the length of the line image 32, so that incident light rays arriving along any incident ray axis (or angle of incidence) which is transmtted through a run or a hole in the fabric will be redirected back toward the lens 31 along an axis paralleling and substantially coincident with the incident ray. Thus, the retro-reflected ray will follow the incident ray axis back to the semitransparent mirror 37 and will be reflected to the photocell 43 in bore 41 to increase conductively through the photocell and supply a pulse to the amplifier to activate the alarm or stop motion shut-down device. It will be apparent when a run, which is the most commonly occurring defect to be detected, occurs in the fabric, this arrangement provides a much greater cumulative defect signal than conventional devices, wherein the photocell is responsive to light reflected or transmitted from a substantially point source area on the fabric, as the system of the present invention provides a line image of light which registers with the run over a substantial distance and produces a very intense defect signal in the form of retro-reflected light. Further, even in the case of a hole defect, a considerably more intense defect signal is produced, and reliability of detection is enhanced since the line image of light is intercepted a number of times by the hole during scanning of the head across the fabric. That is to say, due to the length of the detecting zone established by the line image 32, the photocell cannot miss detecting a hole in the slow-moving fabric material. Also, the reduction in light scattering or light energy loss incident to the use of retro-reflective material would, along with the above-described action, result in a markedly improved defect signal/normal signal ratio. With such improvement in the defect signal/normal signal ratio, it becomes possible to adjust the threshold of the circuitry to a point where variations in light reflectivity of different colored portions of the fabric, as for example plaid fabrics, would not activate the photocell sufficiently to produce a false defect indication, so that the system can be reliably used as a flaw detector with such fabrics.

The principles of the flaw detector head of the previously described embodiment may also be employed in a stationary detector installation to sense holes in wide material without scanning, by mounting a series of heads similar to that previously described in side-by-side relation over a scanning station with the axes of curvature of the lenses in alined parallelism. Such an installation is illustrated diagrammatically in FIGURE 5, wherein the detector heads 60 are each provided with a semi-transparent mirror 61, a lamp 62, and a photocell 63 in the same manner and relationship as the mirror 37, lamp 46 and photocell 43 of the FIGURES 1–4 embodiment, mounted for example in a cut and drilled block similar to the mounting block 33. The series of blocks with the mirrors, lamps and photocells are arranged over a series of cylindrical lenses 64, or a long single lens if desired, with the axis of curvature of the lenses or lens alined along a selected rectilinear axis transversely spanning the fabric to be inspected and extending perpendicular to the direction of fabric feed. Below the fabric is a strip of retro-reflective material 65 like the strip 54 of the FIGS. 1–4 embodiment. The lamps and associated masking apertures (like bore 39 of the first embodiment), and cylindrical lenses are arranged to provide a line image at the fabric plane of such length that when the detector heads 60 are placed side-by-side, the adjacent ends of the line images for adjacent detector heads meet or slightly overlap so as to form in effect a continuous line image spanning the entire width of the fabric. The photocells 63 of the heads 60 are each connected to a 250 volt D.C. supply and are coupled through an associated resistor 66 to ground. Signals representing fluctuations in the voltage level at the ungrounded end of resistors 66 are connected through capacitors 67 and isolating diodes 68 to an amplifier, like amplifier 49 in FIGURE 1 to activate an alarm or a shut-down device in the manner previously described.

The detector head of the present invention is also particularly suited, because of its compact size and simplicity, to use with circular knitting machines to detect holes in the tubular knit fabric immediately after the fabric is formed by the needles. Such an application is illustrated in FIGURE 6, wherein the detector head 70 comprises a drilled mounting block 71 similar to the block 33, having a semi-transparent mirror 72 extending into the light source bore 73, a lamp 74 above the bore 73 and a photocell 75 to receive light reflected by mirror 72. The cylindrical lens 76 is mounted in a suitable lens tube fixed to the mounting block 71 over the end of bore 73 remote from the lamp 74, the axis of curvature of the cylindrical lens being parallel to the axis of the fabric tube being knitted so as to produce a line image of light, preferably about one inch in length, elongated along the direction of travel of the fabric to the take-up rolls. Due to the small size of the head 70 it may be readily mounted within or outside of tube of fabric 78 being produced by the needle cylinder 77 of a conventional circular knitting machine in the region between the needles 79 and take-up rolls 80. To facilitate understanding of the location of the detector head 70 in a typical circular knitting machine, there are illustrated in FIGURE 6 certain conventional components of the machine, such as the needle cylinder 77 and needles 79, the dial 81 for the usual welting instrumentalities actuated by cams on the superposed plate 81a, and the shaft 82 of the welting dial journaled in a stationary bracket on the machine. As the tube of fabric 78 is knitted by the needles, it is worked downwardly below the needles into a somewhat conical configuration and is led through the take-up rolls 80, the fabric being constantly rotated by gears (not shown) coupled to the take-up rolls. A support 83 extends downwardly through the welt dial shaft 82 and supports a small target of retro-reflective material 84 like that previously described inside the knit tube and alined with the light beam projected from lamp 74 through lens 76. If a hole appears between the lens 76 and retro-reflective target 84, a high intensity retro-reflection of the beam occurs, which is reflected by mirror 72 to the photocell 75, increasing the conductivity of the cell 75. The cell 75, as in the previously described embodiments, is connected to a suitable D.C. supply, for example 250 volts, and through resistor 85 to ground, the voltage variations at the ungrounded end of resistor 85 being coupled to a control amplifier 86 to energize alarm or shut-down relay 87.

A suitable circuit for the control amplifier 86 is illustrated in FIG. 7, which operates as follows: When the light strikes the photocell 75, the resistance of the cell decreases and causes an increase of current through R1 from the 250 v. D.C. supply. Capacitor C1 couples this positive pulse to R2 and the grid of V1A. R2 is the grid return resistor for this tube. C2 acts as a filter for electrical transients which might cause false actuations of the system. The positive pulse on the grid of V1A causes an increase in current through R5, the plate load resistor. R3 is the cathode bias resistor for V1A. The increase in current through R5 produces a negative voltage change which is capacitively coupled by C3 to R6, the grid return resistor for V1B. The negative voltage change on the grid of V1B causes the current through plate load resistor R8 to decrease. R7 is the cathode bias resistor for V1B. R4 is part of the negative feedback network from the plate of V1B to the cathode of V1A which tends to keep the A.C. gain of the amplifier constant regardless of gain variations in the tube. The decrease in current through R8 produces a positive voltage pulse which is capacitively coupled to the gain control R9, which sets the proper operating level, by C4. R9 returns to a negative D.C. voltage supply of about 8 volts. The voltage on the slide of R9 is the sum of the positive pulse at this point and fixed bias voltage of minus eight volts. If this voltage exceeds the firing voltage of the thyratron V2, the tube conducts. R10 is a grid current limiting resistor for protecting the tube from excessive grid current. When the tube fires, current flows through R11 and 87 and energixes the relay which causes the machine to stop. R11 is a current limiting resistor for the relay. D1 is a diode for suppressing the back EMF from the relay coil when the tube is reset. S1 is the reset switch which is necessary because thyratron type tubes continue to conduct after the grid signal is removed unless the plate voltage is also removed.

T1 is a 115 v. A.C. to 6.3 v. A.C. filament transformer which supplies current to the filaments of the tubes and also the fixed bias supply. D2 is a diode for half wave rectification of the 6.3 v. A.C. R12 is a current limiting resistor for D2. C5 is a filter capacitor for smoothing out the A.C. ripple. R12 and C5 also serve as a transient filter.

With the detector head 70 and retro-reflective target 84 arrangement of FIGURE 6, the disposing of the line image of light in parallelism with the axis of progression of the knit fabric tube from the needles insures that the head will in no event miss a hole or run in the fabric tube. Since the fabric tube rotates about its axis as well as moving axially to the take-up rolls 80, the trace formed by the small area, substantially circular spot of light on the fabric surface produced for conventional heads would be a spiral whose successive convolutions were spaced from each other in the direction of the axis of the fabric tube. In such a case, a small hole occurring at a point in the fabric which lies between successive convolutions of the light spot trace would be missed. Due to the line image of light produced by the detector head assembly of the present invention which spans a sufficient distance axially of the tube to lap somewhat the edge of the trace of the preceding and succeeding convolutions and thus cover the space which might otherwise occur between convolutions if a spot of light were produced, detection of defects in the fabric is insured.

Alternate arrangements for mounting the detector head 70 outside or inside of the fabric tube 78, respectively, for particular circular knitting machine installations are illustrated in FIGURES 8 and 9. In FIGURE 8, the detector head 70 is fixed on a radial arm 90 mounted on the stationary shaft 83 so that the cylindrical lens 76 is facing radially outwardly toward the fabric and the inner cylindrical surface of the needle cylinder 77, and the retro-reflective target 84' is in the form of a cylindrical band fixed to the inner surface of the needle cylinder. In FIGURE 9, the detector head 70 is supported by a bracket 91 on a fixed member 92 of the knitting machine disposed immediately below the needle cylinder 77, with the cylindrical lens 76 facing radially inwardly toward the fabric. The retro-reflective target 84" is mounted on the periphery of a suitable cylindrical or annular spreader 93 journaled on shaft 83 to rotate with the fabric tube 78. In both instances, the action of the detector head 70 and retro-reflective target material to inspect a line image zone elongated in a direction parallel to the fabric tube axis is like that of the FIGURE 6 embodiment.

Yet another modification is illustrated in FIGURES 10, 11, 12 and 13, adapted especially for the inspection of tubular fabric 94 in a cutting room during the layup operation. In such an arrangement a long strip of the tubular fabric 94 is lead between a pair of rows of detector heads 95 positioned on opposite sides of the fabric by suitable supports, and through the bight between a pair of closely spaced fabric gripping rolls 96. The tubular fabric 94 is drawn over a suitable spreader frame 97, for example a wire frame of generally U-shaped configuration having strips of retro-reflective material 97a extending transversely between the legs of the U-shaped spreader frame and facing toward the detector heads 95. The gripping rolls 96 are spaced sufficiently close together to retain the spreader frame in proper alignment with the detector heads during passage of the fabric. The detector heads 95 are formed of modular units 95' of like construction fixed in end-to-end relation as shown in FIGURE 10 in sufficient number to span the width of the flattened fabric tube. Each modular unit 95' comprises an elongated block 98 shaped to mount a cylindrical lens 99 and milled or drilled to provide a slot 98a for admission of light therethrough. Surmounted on the block 98 is a second block 100 having a slot 101 conforming to the slot 98a and having an inclined upper surface 102 against which the semi-transparent mirror 103 is fixed. A slot 104 is drilled at right angles to the axis of slot 101 and is covered by photocell mounting block 105 having a photocell 106 at the center thereof. A Z-shaped member 107 is mounted over block 100 having a light masking slot 108 therein, and a lamp 109 is supported above the slot 108 on bracket 110. The length of the slots formed in the blocks 98 and 100 and in member 107, and the length of cylindrical lens 99 are such that light rays from the lamp 109 will be directed along divergent ray paths in a plane perpendicular to the mean plane of travel of the fabric over a span of several inches, preferably about six inches. By mounting three of such modular units 95' in alignment as shown, a total span of about 18 inches can be attained, which will span the total width of the flattened tubular fabric of customary dimensions. If a hole or run occurs at any point widthwise of the fabric, when the defect encounters the fanned out light beam it will admit sufficient light to the retro-reflective strip 97a to produce return rays along the axis of the incident rays intercepting the defect which will activate the photocell 106 and produce an alarm or shutdown signal. By use of the cylindrical lens modular units 95' on both sides of the fabric with the ends of the fanned out light beam of one unit lapping the beam of the adjacent units, and retro-reflective material on the spreader frame, the entire width of the flattened tubular fabric can be inspected at one time.

While several preferred examples of the present invention have been particularly shown and described, it is apparent that further modifications may be made therein within the spirit and scope of the invention, and it is desired, therefore, that only such limitations be placed on the invention as are imposed by the prior art and set forth in the appended claims.

What is claimed is:

1. Fabric flaw detecting apparatus for detecting holes and like selected aperture conditions in knit fabric while the fabric is moving relative to a fabric handling machine and producing defect signals upon occurrence of such aperture defects comprising a detector head including a substantially point source of light, optical lens means for concurrently directing light rays from said source along a plurality of selected diverse incident ray paths to collectively and simultaneously form an elongated image of light at the fabric to be inspected, retro-reflective means disposed on the opposite side of said fabric from said detector head positioned to receive light from said source along said incident ray paths intercepted by said selected aperture conditions in the fabric in retro-reflect the same back along its incident ray path, photocell means in said detector head, a semi-transparent mirror between said lens means and light source to transmit light from said source toward said lens means and to reflect any of said retro-reflected light rays to said photocell means, and means responsive to a selected level of light activation of said photocell means to generate a signal indicative of detection of the selected aperture conditions.

2. Fabric flaw detecting apparatus for detecting runs, holes and like aperture defects in knit fabric while the fabric is moving relative to a fabric handling machine and producing defect signals upon occurrence of such aperture defects comprising a detector head including a substantially point source of light, a cylindrical lens for concurrently directing light rays from said source along divergent incident ray paths lying in a single plane to simultaneously form a line image of light at the fabric to be inspected spanning a selected distance, retro-reflective means disposed on the opposite side of said fabric from said detector head positioned to receive light from said source along any of said incident ray paths intercepted by an aperture defect in the fabric and retro-reflect the same back along its incident ray path, photocell means in said detector head, a semi-transparent mirror between said lens and light source to transmit light from said source toward said lens and to reflect any of said retro-reflected light rays to said photocell means, and means responsive to a selected level of light activation of said photocell means to generate a signal indicative of flaw detection.

3. Fabric flaw detecting apparatus for a stop-motion device of the type wherein a scanning head is traversed repeatedly along a selected rectilinear scan axis across the width of a fabric web as it emerges from a knitting machine for detecting runs, holes and like aperture defects in the knit fabric and producing defect signals upon occurrence of such aperture defects, comprising a scanning head including a light source providing a substantially point source of light, a cylindrical lens for concurrently directing light rays from said source along divergent incident ray paths lying in a single plane to form a line image of light at the fabric spanning a selected distance and elongated in a direction paralleling the direction of fabric movement from the knitting machine and paralleling the major axis of any runs in the fabric, said line image being elongated in a direction substantially perpendicular to said scan axis, retro-reflective means disposed on the opposite side of said fabric from said scanning head positioned to receive light from said source along any of said incident ray paths intercepted by an aperture defect in the fabric and retor-reflect the same back along its incident ray path, photocell means in said scanning head, a semi-transparent mirror between said lens and light source to transmit light from said source toward said lens and to reflect any of said retro-reflected light rays to said photocell means, and means responsive to a selected level of light activation of said photocell means to generate a signal indicative of flaw detection.

4. Flaw detecting apparatus as defined in claim 3, wherein said scanning head includes an integral mounting block for supporting said mirror, photocell means and light source, said block having a first bore therein axially alined with a principal optical axis of said lens at the center of said lens, said block having a second bore axially perpendicular to said first bore intercepting said first bore intermediate the ends of the latter for housing said photocell means, said block having a third bore axially paralleling said second bore for supporting said light source in alinement with said first bore, said block having a rectilinear cut through one end thereof intercepting said first bore in inclined relation to the axis of the latter adjacent the intersection of said first and second bores to receive and support said semi-transparent mirror at a position to direct said retro-reflected rays entering said first bore to the photocell means housed in said second bore.

5. Fabric flaw detecting apparatus for detecting runs, holes and like aperture defects in flattened circular knit fabric tubes, while the fabric tube is moving relative to a fabric handling machine and producing defect signals upon occurrence of such aperture defects comprising a pair of detector head assemblies located on each of opposite sides of the flattened fabric tube, each of said detector head assemblies comprising at least one detector head unit including a light source providing a substantially point source of light, a cylindrical lens having its axis of curvature alined transversely of the fabric tube for concurrently directing light rays from said source along divergent incident ray paths lying in a single plane to form a line image of light at the fabric to be inspected scanning a selected width of the fabric tube, retro-reflective means disposed within said fabric tube extending at least the width of the fabric tube positioned to receive light from said source along any of said incident ray paths intercepted by an apertured defect in the fabric tube and retro-reflect the same back along its incident ray path, a photocell in said detector head, a semi-transparent mirror between said lens and light source to transmit light from said source toward said lens and to reflect any of said retro-reflected light rays to said photocell, and means responsive to a selected level of light activation of said photocell to generate a signal indicative of flaw detection.

6. Fabric flaw detecting apparatus as defined in claim 5, wherein said detector head unit includes elongated block means having longitudinally extending light passage slots therein and surfaces rigidly supporting said light source, photocell, mirror and lens thereon in fixed relation to each other, said light passage slots having a length to pass light rays over the range of said divergent ray paths forming said line image.

7. Fabric flaw detecting apparatus as defined in claim 5, wherein each of said detector head assemblies comprises a plurality of said detector head units disposed in end-to-end relation with the axes of curvature of their cylindrical lenses alined in said single plane, said detector head units being spaced relative to each other to dispose the end portions of the line image produced thereby in lapping relation to an end portion of the line image produced by each immediately adjacent detector head unit whereby the line images of the plurality of detector head units of each said assembly collectively span the whole width of the flattened fabric tube without interruption.

8. Fabric flaw detecting apparatus for use with a circular knitting machine having a needle cylinder and take-up rolls near the axis of the needle cylinder to rotate and draw tubular fabric formed by the needles in a substantially conical configuration from the needle cylinder, said flaw detecting apparatus comprising a detector head adapted to be disposed adjacent the needle cylinder and including a light source providing a substantially point source of light, a cylindrical lens for concurrently directing light rays from said source along selected incident ray paths to form a line image of light at the fabric adjacent the detector head arranged in parallelism with the axis of the needle cylinder to span a zone of sufficient length so that successive convolutions of a trace of the line image on the moving fabric are at least in edgewise contact, retro-reflective means disposed on the opposite side of the fabric tube from said head positioned to receive light from said source along said incident ray paths intercepted by an aperture defect in the fabric and retro-reflect the same back along its incident ray path, a photocell in said detector head, a semi-transparent mirror between said lens and light source to transmit light from said source toward said lens and to reflect any of said retro-reflected light rays to said photocell, and means responsive to a selected level of light activation of said photocell to generate a signal indicative of flaw detection.

9. Fabric flaw detecting apparatus for use with a circular knitting machine having a needle cylinder and take-up rolls near the axis of the needle cylinder to rotate and draw tubular fabric formed by the needles in a substantially conical configuration from the needle cylinder, said flaw detecting apparatus comprising a detector head adapted to be disposed within the needle cylinder between the outer wall thereof and the conically configurated tubular fabric and between the needles and take-up rolls and including a light source providing a substantially point source of light, a cylindrical lens for concurrently directing light rays from said source along selected incident ray paths to form a line image of light at the fabric adjacent the detector head arranged in parallelism with the axis of the needle cylinder to span a zone of sufficient length so that successive convolutions of a trace of the line image on the moving fabric are at least in edgewise contact, retro-reflective means disposed within the fabric tube positioned to receive light from said source along said incident ray paths intercepted by an aperture defect in the fabric and retro-reflect the same back along its incident ray path, a photocell in said detector head, a semi-transparent mirror between said lens and light source to transmit light from said source toward said lens and to reflect any of said retro-reflected light rays to said photocell, and means responsive to a selected level of light activation of said photocell to generate a signal indicative of flaw detection.

10. Fabric flaw detecting apparatus as defined in claim 8, wherein said needle cylinder is a hollow annular member having an inwardly facing cylindrical surface, said detector head being located within the hollow portion of said needle cylinder with said cylindrical lens facing toward said cylindrical surface at a location where the knit tubular fabric lies therebetween, and said retro-reflective means being an annular band of retro-reflective material on said cylindrical surface disposed to receive light from said light sources through aperture defects in the fabric and retro-reflect the same to said photocell.

11. Fabric flaw detecting apparatus as defined in claim 8, wherein said detector head is located radially outwardly of the fabric immediately below said needle cylinder with said cylindrical lens facing radially inwardly toward the exterior surface of the tubular fabric, a spreader of generally cylindrical configuration disposed within the tubular fabric adjacent said needle cylinder having a cylindrical peripheral surface for engaging and spreading the fabric in alinement with the mean optical axis of said lens, and said retro-reflective means being an annular band of retro-reflective material on said cylindrical surface of said spreader for receiving light emerging from said source through said lens and retro-reflecting the light back toward said lens.

12. Flaw detecting apparatus as defined in claim 8, wherein said detector head includes an integral mounting block for supporting said mirror, photocell and light source, said block having a first bore therein axially alined with a principal optical axis of said lens, said block having a second bore axially perpendicular to said first bore intercepting said first bore intermediate the ends of the latter for housing said photocell, said block having a third bore axially paralleling said second bore for supporting said light source in alinement with said first bore, said block having a rectilinear cut through one end thereof intercepting said first bore in inclined relation to the axis of the latter adjacent the intersection of said first and second bores to receive and support said semi-transparent mirror at a position to direct said retro-reflected rays entering said first bore to the photocell housed in said second bore.

References Cited

UNITED STATES PATENTS

| | | | |
|---|---|---|---|
| 2,611,097 | 9/1952 | Stanley et al. | |
| 2,694,305 | 11/1954 | Lafevillade | 66—166 X |
| 2,859,603 | 11/1958 | Edelman et al. | 66—166 |
| 2,878,589 | 3/1959 | Mongello. | |
| 2,944,463 | 7/1960 | Rantsch | 88—40 X |
| 3,055,200 | 9/1962 | Meiners et al. | 66—166 |
| 3,056,032 | 9/1962 | Cannon | 250—219 |
| 3,065,615 | 11/1962 | Abrams | 66—166 |
| 3,116,621 | 1/1964 | Klein et al. | 66—166 |
| 3,198,951 | 8/1965 | Lentz | 250—210 |
| 3,230,305 | 1/1966 | Kendrick | 250—219 X |

WM. CARTER REYNOLDS, *Primary Examiner.*